United States Patent
Imhof

(10) Patent No.: US 10,901,118 B2
(45) Date of Patent: Jan. 26, 2021

(54) METHOD AND SYSTEM FOR ENHANCING MESHES FOR A SUBSURFACE MODEL

(71) Applicant: Matthias Imhof, Katy, TX (US)

(72) Inventor: Matthias Imhof, Katy, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 742 days.

(21) Appl. No.: 15/724,023

(22) Filed: Oct. 3, 2017

(65) Prior Publication Data

US 2018/0120478 A1    May 3, 2018

Related U.S. Application Data

(60) Provisional application No. 62/414,374, filed on Oct. 28, 2016.

(51) Int. Cl.
*G01V 99/00* (2009.01)
*G01V 1/30* (2006.01)

(52) U.S. Cl.
CPC ............ *G01V 99/005* (2013.01); *G01V 1/302* (2013.01)

(58) Field of Classification Search
CPC ............................ G01V 99/005; G01V 1/302
See application file for complete search history.

(56) References Cited

U.S. PATENT DOCUMENTS

| 6,362,820 B1 | 3/2002 | Hoppe |
| 8,213,261 B2 | 7/2012 | Imhof et al. |
| 8,360,144 B2 | 1/2013 | Imhof |
| 8,447,524 B2 | 5/2013 | Chen et al. |
| 8,612,195 B2 | 12/2013 | Sun et al. |
| 8,855,987 B2 | 10/2014 | Imhof et al. |
| 9,008,972 B2 | 4/2015 | Imhof et al. |
| 9,128,204 B2 | 9/2015 | Nowak et al. |
| 9,176,247 B2 | 11/2015 | Imhof et al. |
| 9,194,968 B2 | 11/2015 | Imhof et al. |
| 9,366,772 B2 | 6/2016 | Imhof |
| 9,523,782 B2 | 12/2016 | Imhof |
| 9,529,115 B2 | 12/2016 | Dimitrov et al. |
| 2003/0046617 A1* | 3/2003 | MacPherson ........... G06T 17/20 714/48 |
| 2010/0149917 A1 | 6/2010 | Imhof et al. |
| 2011/0048731 A1 | 3/2011 | Imhof et al. |
| 2011/0310101 A1* | 12/2011 | Prange .................... G06T 17/05 345/420 |

(Continued)

OTHER PUBLICATIONS

Trotts et al. "Simplification of Tetrahedral Meshes with Error Bounds". IEEE Transactions on Visualization and Computer Graphics, vol. 5, No. 3, Jul.-Sep. 1999. pp. 224-237. (Year: 1999).*

(Continued)

*Primary Examiner* — Eunhee Kim
(74) *Attorney, Agent, or Firm* — ExxonMobil Upstream Research Company Law Department

(57) ABSTRACT

A method and system are described for creating a subsurface model. In this method, a watertight framework may be adjusted to lessen the ill-formed mesh elements. The method collapses mesh elements and/or eliminates nodes enhance the watertight framework and subsequent subsurface model. The resulting subsurface model may be used in reservoir simulations and hydrocarbon operations.

28 Claims, 4 Drawing Sheets

(56) References Cited

U.S. PATENT DOCUMENTS

| | | |
|---|---|---|
| 2011/0313737 A1* | 12/2011 | Hadj-Sassi ............ G01V 99/005 |
| | | 703/2 |
| 2013/0151161 A1 | 6/2013 | Imhof et al. |
| 2014/0118350 A1 | 5/2014 | Imhof et al. |
| 2014/0278115 A1 | 9/2014 | Bas et al. |
| 2014/0278311 A1 | 9/2014 | Dimitrov et al. |
| 2014/0278317 A1 | 9/2014 | Dimitrov et al. |
| 2014/0303896 A1 | 10/2014 | Wrobel et al. |
| 2014/0358445 A1 | 12/2014 | Imhof et al. |
| 2014/0365132 A1 | 12/2014 | Imhof et al. |
| 2015/0254567 A1 | 9/2015 | Imhof |
| 2015/0293247 A1 | 10/2015 | Imhof et al. |
| 2015/0309197 A1 | 10/2015 | Dimitrov et al. |
| 2015/0316685 A1 | 11/2015 | Dimitrov et al. |
| 2016/0090825 A1* | 3/2016 | Imhof .................... E21B 43/00 |
| | | 703/10 |
| 2016/0377753 A1 | 12/2016 | Paiva et al. |
| 2017/0169608 A1* | 6/2017 | Starhill .................. G06T 15/04 |

OTHER PUBLICATIONS

Si, H. (2015) "TetGen, a Delaunay-Based Quality Tetrahedral Mesh Generator", ACM Trans. on Mathematical Software, vol. 41 No. 2, Article 11, January; pp. 11:1-11:36.

Xu, N. et al. (2009) *"Wire Frame: A Reliable Approach to Build Sealed Engineering Geological Models"*, Computers and Geosciences, Pergamon Press, Oxford, GB, vol. 35, No. 8, pp. 1582-1591 (XP026338413).

* cited by examiner

METHOD AND SYSTEM FOR ENHANCING MESHES FOR A SUBSURFACE MODEL

CROSS-REFERENCE TO RELATED APPLICATION

This application claims the benefit of U.S. Provisional Patent Application 62/414,374 filed Oct. 28, 2016 entitled METHOD AND SYSTEM FOR ENHANCING MESHES FOR A SUBSURFACE MODEL, the entirety of which is incorporated by reference herein.

FIELD OF THE INVENTION

This disclosure relates generally to the field of hydrocarbon exploration, development and production and, more particularly, to subsurface modeling. Specifically, the disclosure relates to a method for enhancing watertight frameworks for use in a subsurface model. The resulting enhanced watertight framework may enhance a subsurface model for a subsurface region, which may then be used for reservoir simulations and hydrocarbon operations, such as hydrocarbon exploration, hydrocarbon development and/or hydrocarbon production.

BACKGROUND

This section is intended to introduce various aspects of the art, which may be associated with exemplary embodiments of the present disclosure. This discussion is believed to assist in providing a framework to facilitate a better understanding of particular aspects of the present invention. Accordingly, it should be understood that this section should be read in this light, and not necessarily as admissions of prior art.

In exploration, development and/or production stages for resources, such as hydrocarbons, different types of subsurface models may be used to represent the subsurface structures, which may include a description of a subsurface structures and material properties for a subsurface region. For example, the subsurface model may be a geologic model or a reservoir model. The subsurface model may represent measured or interpreted data for the subsurface region, may be within a physical space or domain, and may include objects (e.g., horizons, faults, surfaces, volumes, and the like). The subsurface model may also be discretized with a mesh or a grid that contains elements, such as nodes and forms other elements, such as edges, faces and cells (e.g., voxels) within the model. The geologic model may represent measured or interpreted data for the subsurface region, such as seismic data and well log data, and may have material properties, such as rock properties. The reservoir model may be used to simulate flow of fluids within the subsurface region. Accordingly, the reservoir model may use the same mesh and/or cells as other models, or may resample or upscale the mesh and/or cells to lessen the computations for simulating the fluid flow.

The development of the reservoir model or geologic model may be problematic. For example, faults are discontinuities in the subsurface regions, which are difficult to handle in subsurface modeling. For example, the resulting grid may not form closed compartments or subvolumes, which may be problematic for populating material properties into the objects and/or blocks to form the subsurface model. In particular, objects may partially contact each other forming open areas or voids and may also overlap. As a result, the material properties may have to be assigned manually (e.g., by a designer, modeler or user) to only one object or block at a time. In addition to being inefficient, the process may introduce errors and uncertainty through a manual process that is based on subjective decisions.

It is advantageous to create a watertight framework where elements are shared rather than being duplicated or intersecting each other. An edge is formed by two different nodes. Two edges only intersect by sharing a common node. Faces are formed from edges. Two faces only intersect by sharing a common edge. Cells are formed from faces. Two cells only intersect by sharing a common face. It may be advantageous to further exclude internal gaps between elements.

In a watertight framework, elements are shared, rather than being duplicated or intersecting each other. For example, an edge is formed by two different nodes and two edges only intersect by sharing a common node. Also, faces are formed from edges and two faces only intersect by sharing a common edge. Further, cells are formed from faces and two cells only intersect by sharing a common face. Moreover, internal gaps may also be excluded between elements.

Once a framework is formed, it may be determined that the mesh may need to be repaired or modified because one or multiple element violate watertightness. However, conventional mesh repair approaches do not involve repairing certain types of object intersections, such as T-junctions, which involve multiple mesh elements intersecting along common edges. In addition, conventional approaches require manual intervention to preserve T-junctions, while removing mesh overlaps and gaps.

Accordingly, there remains a need in the industry for methods and systems that are more efficient and may lessen problems associated with creating a subsurface model (e.g., a watertight model, a geologic model or a reservoir model) for use in hydrocarbon operations. Further, a need remains for efficient approaches to detect and repair mesh problems within a watertight framework. Specifically, a need remains to enhance the quality of the watertight framework and further to lessen the number of elements formed within the mesh. The present techniques provide a method and apparatus that overcome one or more of the deficiencies discussed above.

SUMMARY

In one embodiment, a method for generating a subsurface model for a subsurface region is described. The method comprises: obtaining a watertight framework associated with a subsurface region, wherein the watertight framework comprises a mesh that includes a plurality of mesh elements and is formed from a plurality of nodes and a plurality of edges; determining three-dimensional mesh element volumes, two-dimensional mesh element areas and edge lengths based on the plurality of mesh elements, the plurality of nodes and the plurality of edges in the watertight framework; identifying an edge collapse order based on the computed the mesh element volumes, two-dimensional mesh element areas and edge lengths; performing collapse operations on one or more edges based on the edge collapse order until a convergence criterion has been satisfied; and outputting an updated watertight framework. In addition, the embodiment may comprise obtaining a watertight framework based three-dimensional mesh elements; computation of volume, area, and length computation for these elements, specification of an edge collapse order; and performance of collapse operations until a convergence criterion has been satisfied. The determining three-dimensional mesh element volumes, two-dimensional mesh element areas and edge lengths may further comprises: converting two-dimensional mesh elements into three-dimensional mesh elements based on the plurality of mesh elements, the plurality of nodes and the plurality of edges in the watertight framework; and computing the three-dimensional mesh element volumes, the two-dimensional mesh element areas and edge lengths.

In another embodiment, a system for generating a subsurface model associated with a subsurface region is described. The system comprises: a processor; an input device in communication with the processor and configured to receive input data associated with a subsurface region; and memory in communication with the processor. The memory having a set of instructions, wherein the set of instructions, when executed, are configured to: obtain a watertight framework associated with a subsurface region, wherein the framework comprises a mesh that includes a plurality of mesh elements and is formed from a plurality of nodes and a plurality of edges; convert two-dimensional mesh elements into three-dimensional mesh elements; compute three-dimensional mesh element volumes, two-dimensional mesh element areas and edge lengths; identify an edge collapse order based on the computed mesh element volumes, two-dimensional mesh element areas and edge lengths; perform collapse operations on one or more edges based on the edge collapse order until a convergence criterion has been satisfied; and output an updated watertight framework.

BRIEF DESCRIPTION OF THE DRAWINGS

The advantages of the present invention are better understood by referring to the following detailed description and the attached drawings.

DETAILED DESCRIPTION

Figure 1:
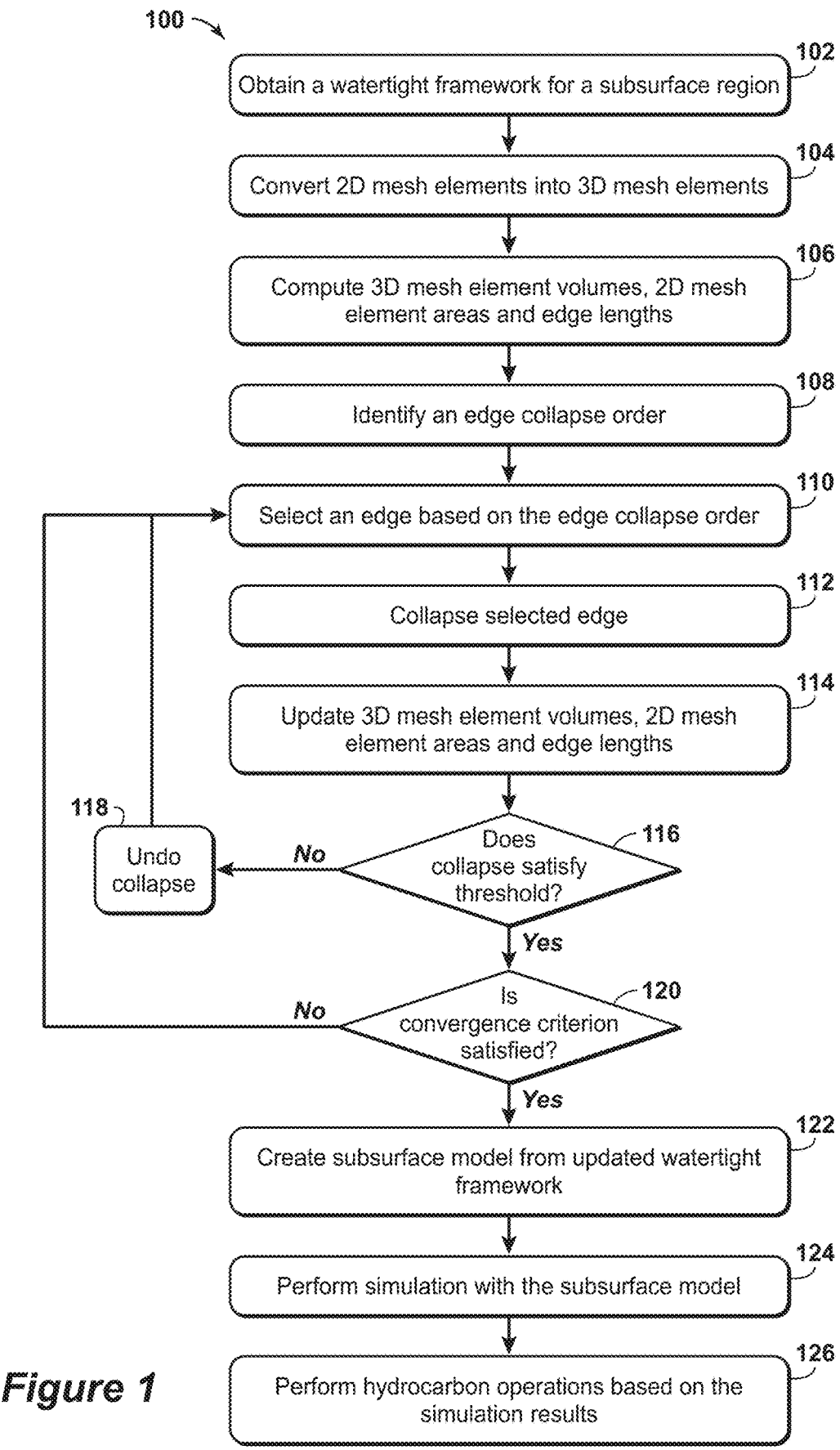
FIG. 1 is an exemplary flow chart in accordance with an embodiment of the present techniques.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

The articles "the", "a" and "an" are not necessarily limited to mean only one, but rather are inclusive and open ended so as to include, optionally, multiple such elements.

As used herein, the term "hydrocarbons" are generally defined as molecules formed primarily of carbon and hydrogen atoms such as oil and natural gas. Hydrocarbons may also include other elements or compounds, such as, but not limited to, halogens, metallic elements, nitrogen, oxygen, sulfur, hydrogen sulfide ($H_2S$) and carbon dioxide ($CO_2$). Hydrocarbons may be produced from hydrocarbon reservoirs through wells penetrating a hydrocarbon containing formation. Hydrocarbons derived from a hydrocarbon reservoir may include, but are not limited to, petroleum, kerogen, bitumen, pyrobitumen, asphaltenes, tars, oils, natural gas, or combinations thereof. Hydrocarbons may be located within or adjacent to mineral matrices within the earth, termed reservoirs. Matrices may include, but are not limited to, sedimentary rock, sands, silicilytes, carbonates, diatomites, and other porous media.

As used herein, "hydrocarbon exploration" refers to any activity associated with determining the location of hydrocarbons in subsurface regions. Hydrocarbon exploration normally refers to any activity conducted to obtain measurements through acquisition of measured data associated with the subsurface formation and the associated modeling of the data to identify potential locations of hydrocarbon accumulations. Accordingly, hydrocarbon exploration includes acquiring measurement data, modeling of the measurement data to form subsurface models and determining the likely locations for hydrocarbon reservoirs within the subsurface. The measurement data may include seismic data, gravity data, magnetic data, electromagnetic data and the like.

As used herein, "hydrocarbon development" refers to any activity associated with planning of extraction and/or access to hydrocarbons in subsurface regions. Hydrocarbon development normally refers to any activity conducted to plan for access to and/or for production of hydrocarbons from the subsurface formation and the associated modeling of the data to identify preferred development approaches and methods. By way of example, hydrocarbon development may include modeling of the subsurface formation and extraction planning for periods of production; determining and planning equipment to be utilized and techniques to be utilized in extracting the hydrocarbons from the subsurface formation and the like.

As used herein, "hydrocarbon operations" refers to any activity associated with hydrocarbon exploration, hydrocarbon development and/or hydrocarbon production.

As used herein, "hydrocarbon production" refers to any activity associated with extracting hydrocarbons from subsurface location, such as a well or other opening. Hydrocarbon production normally refers to any activity conducted to form the wellbore along with any activity in or on the well after the well is completed. Accordingly, hydrocarbon production or extraction includes not only primary hydrocarbon extraction, but also secondary and tertiary production techniques, such as injection of gas or liquid for increasing drive pressure, mobilizing the hydrocarbon or treating by, for example chemicals or hydraulic fracturing the wellbore to promote increased flow, well servicing, well logging, and other well and wellbore treatments.

As used herein, the term "framework" or "structural framework" means an organized assembly of objects (e.g., faults and/or horizons) within a specific volume known as an area or interest or volume of interest. The organization may include horizon order, truncation relationships and/or faulting order. The organized assembly of objects may include gaps and/or voids within the specific volume.

As used herein, "watertight" means that a containing specific volume can be divided into one or more volume compartments with boundaries that have no holes and no overlaps with other boundaries. A watertight framework of faults and horizons divides a containing specified volume of interest into one or more volume compartments that have boundaries completely enclosing the compartments. Each fault and horizon is either a boundary of or contained within a volume compartment without any piece outside of a compartment. For example, in a watertight triangular mesh framework, every triangle face on the boundary of a compartment shares each of its three edges with one other triangle to completely enclose the compartment. No two triangles may overlap partially and no two triangles may intersect unless the intersection is formed by on common and two common nodes. In some embodiment, no two triangles may overlap in their entirety. In another embodiment, this restriction is loosened only where two surfaces are merged and either collocated triangles or duplicated triangles are carried to denote each of the two merged surfaces. Within this compartment, there may be a partial fault that does not completely subdivide the compartment, and a triangle face on the edge of the partial fault may not share an edge with another triangle.

As used herein, "triangle" refers to a semi-planar polygon formed from nodes and edges between nodes. Triangle may include triangular, quadrilateral, or other polygons.

As used herein, a semi-planar polygon formed from nodes and edges between nodes (e.g., a triangle) is also referred to as a "face".

As used herein, "tetrahedron" refers to a polygon formed from nodes, edges, and faces. Tetrahedron may include tetrahedral, hexahedral, or other polyhedrons.

As used herein, a "cell" refers to a polyhedron polygon formed from nodes, edges, and faces (e.g., a tetrahedron) is also referred to as a "cell".

As used herein, an "interior node" refers to a node that belongs to the mesh of only one surface and/or only one mesh patch. For example, the mesh of one surface may be segmented into one or more patches, which may be mutually exclusive, but contiguous patches.

As used herein, a "contact node" belongs to the meshes for two different surfaces and/or two different mesh patches. For example, the mesh of one surface may be segmented into one or more patches, which may be mutually exclusive, but contiguous patches.

As used herein, an "invariant node" belongs to the meshes of at least three surfaces and/or at least three different mesh patches and/or two different mesh patches. For example, the mesh of one surface may be segmented into one or more patches, which may be mutually exclusive, but contiguous patches.

As used herein, a "protected node" is designated by the user, an agent, or another algorithm. "Protected" is a secondary label that may be assigned in addition to one of "interior", "contact", or "invariant". For example, the user may designate an "interior node" to be a "protected node" to prevent the removal of the node by collapse operations.

As used herein, a "source node" or "source" refers to a node that is moved to a "target node" or "target", where source and target form an edge in the mesh.

As used herein, "surface" refers to geologic features such as horizon and fault as well as technical features, such as model boundary, concession boundary, or artificial compartment boundary. A horizon separates two packages of rock, while a fault is a discontinuity of rock packages. Often, a fault exhibits displacement. An artificial compartment boundary may be used for accounting purposes.

Preferably, a technical-feature surface, such as model boundary surface, is broken into pieces along pillars or places where the surface is not-differentiable. For example, the model boundary is a box formed by six sides, then each of the sides forms an individual boundary surface. The volume of interest is often formed using an area-of-interest polygon that is vertically extruded to form boundary surfaces. Each of the extruded polygon edges forms an individual boundary surface.

As used herein, "subsurface model" refers to a reservoir model, geomechanical model, watertight model and/or a geologic model. The subsurface model may include subsurface data distributed within the model in two-dimensions (e.g., distributed into a plurality of cells, such as elements or blocks), three-dimensions (e.g., distributed into a plurality of voxels) or three or more dimensions.

As used herein, "geologic model" is three-dimensional model of the subsurface region having static properties and includes objects, such as faults and/or horizons, and properties, such as facies, lithology, porosity, permeability, or the proportion of sand and shale.

As used herein, "reservoir model" is a three-dimensional model of the subsurface that in addition to static properties, such as porosity and permeability, also has dynamic properties that vary over the timescale of resource extraction, such as fluid composition, pressure, and relative permeability.

As used herein, "zone", "region", "block", "container", or "compartment" is a defined space, area or volume contained in the framework or model, which may be bounded by one or more objects. The volume may include similar properties.

As used herein, "mesh" or "grid" is a representation of a region of space (e.g., 2-D domain or 3-D domain), which may include objects, and includes two or more nodes, edges formed from nodes, and a set of polygons or polyhedrons disposed within the region (e.g., a volumetric representation). The mesh may represent each object by a set of polygons or polyhedrons disposed within the region. Properties may be assigned to some or all elements including nodes, edges, faces, or cells.

As used herein, "simulate" or "simulation" is the process of performing one or more operations using a subsurface model and any associated properties to create simulation results. For example, a simulation may involve computing a prediction related to the resource extraction based on a reservoir model. A reservoir simulation may involve performing by execution of a reservoir-simulator computer program on a processor, which computes composition, pressure, or movement of fluid as function of time and space for a specified scenario of injection and production wells by solving a set of reservoir fluid flow equations. A geomechanical simulation may involve performing by execution of a geomechanical simulator computer program on a processor, which computes displacement, strain, stress, shear slip, energy release of the rock as a function of time and space in response to fluid extraction and injection.

In hydrocarbon operations, a subsurface model is created in the physical space or domain to represent the subsurface region. The subsurface model is a computerized representation of a subsurface region based on geophysical and geological observations made on and below the surface of the Earth. The subsurface model may be a numerical equivalent of a three-dimensional geological map complemented by a description of physical quantities in the domain of interest. The subsurface model may include multiple dimensions and is delineated by objects, such as horizons and faults. The subsurface model may include a structural framework of objects, such as faults and horizons, and may include a mesh or grid of nodes to divide the structural framework and/or subsurface model into blocks, which may include cells in two-dimensions, voxels in three-dimensions or other suitable elements in other dimensions. A block, such as cell or voxel, is a subvolume of the space, which may be constructed from nodes within the mesh. In the subsurface model, material properties, such as rock properties (e.g., permeability and/or porosity), may be represented as continuous volumes or unfaulted volumes in the design space, while the physical space may be represented as discontinuous volumes or faulted volumes (e.g., contain volume discontinuities, such as post-depositional faults).

Within the subsurface models, a grid or mesh may be used to partition the model into different subvolumes, which may be used in hydrocarbon operations, such as reservoir simulation studies in reservoir exploration, development and/or production stages, as well as for representing a subsurface model description of a reservoir structure and material properties. Accordingly, the grid or mesh may be configured to form blocks that may represent material properties, such as rock and fluid properties, of a reservoir or may be used for numerical discretization of partial differential equations, such as fluid flow or wave propagation.

By way of example, frameworks for subsurface models may use triangular meshes. To provide a mechanism to assign properties within the framework, the triangles share nodes, which involves contacting each other at the edges. The process of forming a watertight framework involves sealing the different triangles within the mesh to form various sealed or closed compartments. The computational costs of forming and validating such a framework may be high. Accordingly, it is advantageous to preserve watertightness when further manipulating the framework.

Certain methods for framework formation may create clusters of triangles that below a specific threshold or size. These triangles may be ill-shaped and challenging to utilize in modeling. For example, the grouping or clusters of small ill-shaped triangles may increase the computational costs and complexity of subsequent operations performed on the framework, such as property assignments and/or generation of a geocellular grid based on the framework. For example, the grouping or clusters of small ill-shaped triangles may decrease computational robustness and numerical stability by raising the condition number, for example. The condition number is the value associated with the convergence or solvability of the model. As a result, the present techniques provide a method of resolving the smaller triangles, while preserving the watertightness of the framework.

In one configuration, mesh simplification may be performed by simplifying mesh surfaces under the constraint that the surfaces remain watertight at their contacts (e.g., nodes and edges), for example by preserving these contacts. Unfortunately, manipulating surfaces independently from each other may cause spurious intersections away from established contacts. The editing or simplifying a mesh may involve removing a node, collapsing an edge, or combining triangles. Regardless of the operation performed, the underlying mesh is coarsened and may extend into or through another surface.

Further, once a watertight framework is formed, the method may include determining whether a mesh contains numerous small elements with large aspect ratios with greatly varying angles, lengths, and areas. The degenerate elements often cluster where surfaces intersect, which may be along contacts where two surfaces intersect, or near invariant nodes where three or more surfaces intersect.

Accordingly, it may be advantageous to substitute such degenerate elements with modified elements having preferred forms to reduce the number of elements for computational efficiency of subsequent operations and to enhance numerical stability of subsequent operations.

The present techniques simplify the mesh in a volumetric sense, which maintains the spatial context of the triangles and provides a mechanism for detecting and preventing spurious intersections. To begin, a watertight framework is generated and obtained through any method known to those skilled in the art. Then, the mesh within the watertight framework (e.g., a triangular mesh) is converted to a three-dimensional (3D) grid (e.g., a tetrahedral grid) that preferably preserves the mesh elements (e.g., mesh triangles if the grid is a triangular mesh). The surface properties, such as surface names, are transferred to the corresponding 3D mesh element faces (e.g., tetrahedral faces) that form surfaces. Once converted into a 3D mesh, geometric properties of the 3D mesh elements, such as volumes, areas, and lengths, are computed. Edge collapses that violate watertightness are identified because these collapses result in inconsistent volumes, areas, or lengths.

In some embodiments, additional nodes may be inserted into the set of nodal points to facilitate the formation of cells. Such additional nodes are called "Steiner" points that are added to reduce the cost of connecting the points for the formation of cells (and to a lesser degree, edges or faces). Preferably, these additional nodes are not located on surface meshes, but are located inside compartments which do not modify the surfaces because no surface face is split. Preferably, names, labels, and properties are transferred to the split elements.

The watertight framework is modified by collapsing edges. An edge collapse moves one node of an edge (e.g., the source) to the other node (e.g., the target) of the edge. Collapsing an edge shared by two triangles collapses the two triangles and the edge has zero length. Each of these two triangles has zero area. Because one triangle node is moved onto another one, the triangle includes two differentiated nodes, one repeated node and the triangle becomes degenerate. All tetrahedrons that contain the triangle are collapsed, become degenerate and have zero volume. The degenerate elements (e.g., edges, faces and/or cells) are removed and the associated properties are transferred to the neighbors (e.g., the remaining elements that originally contained one of source or target node).

To manage the modifications to the watertight framework, an edge-collapse order may be used to specify the priority of adjustments to be performed on the mesh of the watertight framework. By way of example, the edge-collapse order may include edge length, face area, tetrahedral volumes, angles between edges or faces, or aspect ratios of faces or cells. Further, the edge-collapse order may be a list of edge collapses that move one node to another node along an edge. One additional constraint may be the ranking of a node. The ranking of the node classifies the topological priority of the node. In a preferred embodiment, nodes are classified as interior, contact, invariant, or protected. An interior node belongs to the mesh of only one surface, while a contact node belongs to the meshes for two different surfaces. An invariant node belongs to the meshes of at least three surfaces, while a protected node is designated by the user, an agent, or another algorithm. A node interior to a surface may be moved to any other node that shares a common edge. Thus, an interior node may be moved to an interior node and/or a contact node as long as target and source node are connected by an edge. A node on the contact between two surfaces may move to another node that belongs to the same contact. Thus, a contact node may be moved to a contact node or an invariant node as long as target and source node are connected by an edge. A contact node may not be moved to an interior node, however, without creating geometrical distortions that likely violate watertightness. An invariant node that is shared by three or more surfaces may not be moved without geometrical distortions that likely violate watertightness. In some embodiments, invariant nodes may be moved to another invariant node. Lastly, there may be nodes specified by the user (e.g., protected nodes) that may not be moved, for example, because the nodes belong to specified well markers. Protected nodes may only serve as targets.

In some configurations, a secondary criterion may be specified to determine how an interior-interior edge or a contact-contact edge is collapsed. For an edge connecting either two interior nodes or two contact nodes, either of these two node may serve as source, while the other node may become the target. In some configurations, the first node serves as source and the second node as target. Alternatively, the first node serves as target and the second as another target. In certain configurations, the roles may be assigned at random. Also, in other configurations, the lengths of the other edges are used to determine source and target. In one preferred embodiment, the node associated with the longest remaining edge becomes the source, while the node associated with the shortest remaining edge becomes the target. In another preferred configuration, the node associated with the longest remaining edge becomes the target, while the node associated with the shortest remaining edge becomes the source. In another configuration, the angles at the two nodes used, while other configurations may involve the areas of the faces being used. Preferably, the source and target are selected such that faces originally associated with the source increase in area, while faces originally associated with the target preserve their areas.

In yet other configurations, it may be advantageous to edge collapse to nodes belonging to the same surface. For example, an interior node belonging to one surface may be moved to another interior node belonging to the same surface. In other configurations, an interior node belonging to one surface is moved to a contact node that belongs to the same surface as well as one other surface. Further, an interior node belonging to one surface may be moved to an invariant node that belongs at least to the surface. Preferably, a contact node that belongs to two surfaces may be moved to a contact node that belongs to the same two surfaces. In a further configuration, a contact node that belongs to two surfaces may be moved to an invariant node that belongs at least to the same two surfaces.

In yet still other configurations, it may be beneficial to separate surface meshes further into patch meshes. For example, a surface mesh may be separated at contacts, such that each mesh patch includes contact nodes and invariant nodes on its boundary and interior nodes in its inside. A mesh patch does not contain any interior node on its boundary and does not contain any contact node and invariant node in its inside. Contact nodes and invariant nodes may belong to different patches. In a preferred configuration, surface meshes may be broken into mesh patches. Preferably mesh patches are mutually exclusive. Preferably, each mesh patch is contiguous. Each mesh patch may be labelled or enumerated. Nodes on mesh patches are classified as interior (e.g., belonging to one patch only), contact (e.g., belonging to exactly two patches), invariant (e.g., belonging to at least three patches), or protected. A node interior to a patch may be moved to any other node that shares a common edge. Thus, an interior node may be moved to an interior node and/or a contact node, as long as a target node and a source node are connected by an edge. A node on the contact between two patches may move to another node that belongs to the same contact and shares a common edge. Thus, a contact node may be moved to a contact node or an invariant node as long as target and source node are connected by an edge. A contact node may not be moved to an interior node, however, without creating geometrical distortions that likely violate watertightness. An invariant node that is shared by three or more patches may not be moved without geometrical distortions that likely violates watertightness. In some configurations, invariant nodes may be moved to another invariant node. Lastly, there may be nodes specified by the user (e.g., protected nodes) that may not be moved, for example, because the nodes belong to specified well markers. Protected nodes may only serve as targets.

In a preferred configuration, edges that belong to only one triangle are considered contacts even if they only belong to one patch or surface. This type of configuration may be formed when a surface terminates within the framework rather than extending into another surface.

In a preferred configuration, only edges that belong to the surface mesh may be considered for collapse. Edges that belong to cell faces that were not part of the original mesh may not be considered for collapse. In another preferred configuration, edges associated with Steiner points may not be considered for collapse.

Various constraints may be implemented to manage the collapsing operation. For example, moving a node onto another node collapses an edge and degenerates some triangle faces and tetrahedrons, while coarsening the surface meshes. The degenerate elements (e.g., tetrahedrons, faces, edges) may be removed and the properties may be shifted or recomputed if and only if watertightness is preserved. It may be computationally advantageous to use a proxy to determine watertightness preservation rather than establishing watertightness. One preferred proxy may be conservation of mesh element volumes, such as tetrahedral volumes. Another preferred proxy may be preservation of mesh element area, such as triangular area for tetrahedron faces aligned with inputted surfaces. In one exemplary configuration, volumetric, areal or linear changes may be computed for the entire mesh. Alternatively, volumetric, areal or linear changes may be computed for elements within a specified radius of source and/or target. Further, in another configuration, volumetric, areal or linear changes are computed from only the mesh elements that are associated with the change because these quantities do not change for unaffected mesh elements. In yet another configuration, volumetric, areal or linear changes may be computed only for mesh elements that are directly connected to a source and/or a target.

In addition, a determination may be made whether a collapse operation is acceptable. For example, if a collapse operation is acceptable, then another edge may be selected for collapse unless a convergence criterion is met. If the collapse operation is unacceptable (e.g., because of geometry changes), then the current collapse is undone and another edge is selected for collapse unless a convergence criterion is met. Once the convergence criterion is met or satisfied (e.g., the shortest edge exceeds a threshold or a specified number of nodes has been removed), the watertight framework is outputted. Outputting may involve filtering removed nodes, edges, or triangles and enumerating them anew. In addition, outputting may involve storing the watertight framework in memory or displaying the watertight framework in a visual representation. By way of example, the collapse operation may be used to lessen the number of nodes, mesh elements and/or edges within the mesh of a watertight framework. The reduced number of mesh elements and the associated enhancements to the mesh elements shapes may enhance performance of subsequent steps in forming the subsurface model and using the subsurface model.

In a preferred embodiment, the convergence criterion is based on at least one of the maximal number of nodes, edges, faces, or cells. In another preferred embodiment, the convergence criterion is based on at least one of the minimal size of edge length, face area, or cell volume.

In one embodiment, undoing a collapse involves maintaining backup copies of nodes, faces, cells, assignments and properties. A collapse is undone to replacing or overwriting nodes, faces, cells, assignments and properties with the backup copies. It may advantageous, however, to reinsert the eliminated node into the lists of nodes, faces, and cells, recompute the properties of elements directly connected to source and/or target, and restore assignments of the elements to surfaces and/or patches.

Certain aspects of the present techniques are described by using the example of certain types of meshes, such as triangular meshes. However, as may be appreciated this is not meant as a limitation, but rather as an illustration of the present techniques. Further, the present techniques may be applied to meshes of various types.

The present techniques may be utilized to enhance the creation of a subsurface model. The subsurface model, which may include a reservoir model, geomechanical model, or geologic model, is a computerized representation of a subsurface region based on geophysical and geological observations associated with at least a portion of the specified subsurface region. Subsurface models, such as reservoir models, are typically used as input data for reservoir simulators or reservoir simulation programs that compute predictions for the behavior of rocks and fluids contained within a subsurface region under various scenarios of hydrocarbon recovery. Using subsurface models in simulations provides a mechanism to identify which recovery options offer the most economic, efficient, and effective development plans for a subsurface region (e.g., a particular reservoir and/or field).

Construction of a subsurface model may involve various steps. Initially, a structural model or structural framework is created to include objects (e.g., surfaces, such as faults, horizons, and if necessary, additional surfaces that bound the area of interest for the model). The different objects define volumes, which may be referred to as zones, subvolumes, compartments and/or containers. Then, each zone is meshed or partitioned into sub-volumes (e.g., cells, mesh elements or voxels) defined by a mesh (e.g., a 3-D mesh or 3-D grid). The mesh may then be modified to be a watertight framework. Once the watertight framework is formed, the present techniques may be utilized to enhance the watertight framework.

Then, the properties may be assigned to objects (e.g., transmissibility) and individual sub-volumes (e.g., rock type, porosity, permeability, rock compressibility, or oil saturation). By way of example, the assignment of cell properties may involve assigning each cell a rock type, and then each rock type is assigned spatially-correlated reservoir properties and/or fluid properties. Further, reservoir properties, which may include reservoir quality parameters, such as porosity, permeability, clay content, cementation factors, and other factors that affect the storage and deliverability of fluids contained in the pores of the rocks, may also be assigned. Geostatistical techniques may be used to populate the cells with such properties (e.g., porosity and permeability values) that are appropriate for the rock type of each cell. Rock pores are saturated with groundwater, oil or gas. Fluid saturations may be assigned to the different cells to indicate which fraction of their pore space is filled with the specified fluids. Fluid saturations and other fluid properties may be assigned deterministically or geostatistically.

To enhance the subsurface model building process, the present techniques provide enhancements to the creation and generation of subsurface models. For example, in one embodiment, a method for generating a subsurface model for a subsurface region is described. The method comprises: obtaining a watertight framework associated with a subsurface region, wherein the watertight framework comprises a mesh that includes a plurality of mesh elements and is formed from a plurality of nodes and a plurality of edges; determining three-dimensional mesh element volumes, two-dimensional mesh element areas and edge lengths based on the plurality of mesh elements, the plurality of nodes and the plurality of edges in the watertight framework; identifying an edge collapse order based on the computed the mesh element volumes, two-dimensional mesh element areas and edge lengths; performing collapse operations on one or more edges based on the edge collapse order until a convergence criterion has been satisfied; and outputting an updated watertight framework. In addition, the embodiment may comprise obtaining a watertight framework based three-dimensional mesh elements; computation of volume, area, and length computation for these elements, specification of an edge collapse order; and performance of collapse operations until a convergence criterion has been satisfied. The determining three-dimensional mesh element volumes, two-dimensional mesh element areas and edge lengths may further comprises: converting two-dimensional mesh elements into three-dimensional mesh elements based on the plurality of mesh elements, the plurality of nodes and the plurality of edges in the watertight framework; and computing the three-dimensional mesh element volumes, the two-dimensional mesh element areas and edge lengths.

Further, the method may include various enhancements. By way of example, the method may include wherein performing collapse operations on one or more edges based on the edge collapse order until a convergence criterion has been satisfied further includes: selecting an edge based on the edge collapse order; performing a collapse operation on the selected edge; updating three-dimensional mesh element volumes, two-dimensional mesh element areas and edge lengths based on the collapse operation; determining whether the collapse operation satisfies a threshold; and undoing the collapse operation if the collapse operation does not satisfy the threshold; and storing the updated mesh in the watertight framework if the collapse operation satisfies the threshold. Further, the method may include wherein the edge collapse order is based on edge length, wherein larger edge lengths have a higher priority in the edge collapse order; wherein the edge collapse order is based on face area of one of the plurality of mesh elements, wherein a higher priority is assigned to edges associated with larger face areas in the edge collapse order; wherein the edge collapse order is based on mesh element volume of one of the plurality of mesh elements, wherein a higher priority is assigned to edges associated with larger mesh element volumes in the edge collapse order; wherein the edge collapse order is based on an angle formed by the plurality of mesh elements, wherein a higher priority is assigned to edges opposite angles having larger absolute difference from 60° in the edge collapse order; and/or bypassing an edge in the edge collapse order that has the collapse operation undone. Moreover, the performing collapse operations on one or more edges based on the edge collapse order until a convergence criterion has been satisfied may include: determining whether the convergence criterion is satisfied; if the convergence criterion is not satisfied, selecting another edge based on the edge collapse order; and if the convergence criterion is satisfied, outputting the updated watertight framework; wherein the convergence criterion comprises a number of iterations or the convergence criterion comprises one of a number of edges to be removed, a number of nodes to be removed, a number of mesh elements to be removed or any combination thereof. In addition, the method may include assigning properties to one or more of the plurality of mesh element in the watertight model to form a subsurface model; wherein the subsurface model is a geologic model and the properties comprise one or more of facies, lithology, porosity, permeability, or the proportion of sand and shale, and any combination thereof; wherein the subsurface model is a reservoir model and the properties comprise one or more of porosity, permeability and any combination thereof, further comprising simulating fluid flow within the reservoir model to create simulation results; and/or further comprising performing hydrocarbon operations based on the simulation results.

Beneficially, the present techniques provide various enhancements to the hydrocarbon extraction process. In the present techniques, watertight frameworks are modified in a manner that maintains the watertight compartments, while simplifying the complexity of the framework discretization. The present techniques also may lessen the number of nodes, edges, and faces that form the framework. The present techniques may lessen the aspect ratios of faces that form the framework and/or may equalize the range of edge lengths and face areas. Further, by utilizing the present techniques, a more uniform mesh may be created and may lessen computational costs of subsequent operations and/or enhance numerical stability of subsequent operations. The present techniques may be further understood with reference to FIGS. 1 to 6, which are described further below.

FIG. 1 is an exemplary flow chart 100 in accordance with an embodiment of the present techniques. The flow chart 100 includes a method for creating a subsurface model and using the created subsurface model for hydrocarbon operations. The method may include obtaining a watertight framework, as shown in block 102, and modifying the watertight framework, as shown in blocks 104 to 120. Then, the subsurface model may be created and used to perform simulations and for hydrocarbon operations, as shown in blocks 122 to 126.

To begin, the method involves obtaining a watertight framework for a subsurface region, as shown in block 102. The watertight framework may be obtained by accessing memory, a file, or a server; or creating or generating the watertight framework. A watertight framework may include a mesh of nodes that contains a specific volume and is divided into closed compartments with boundaries (e.g., no gaps and no overlaps). The creation of the watertight framework may be known to those skilled in the art.

Once obtained, the watertight framework may be modified, as shown in blocks 104 to 120. At block 104, the two-dimensional (2D) mesh elements are converted into three-dimensional (3D) mesh elements. This conversion may involve a mesh generator. By way of example, with triangular meshes, the conversion from triangles to tetrahedrons is preferably performed by a tetrahedral mesh generator or a module configured to perform a 3D Delaunay triangulation. An exemplary method is described in Hang Si, entitled "TetGen, a Delaunay-Based Quality Tetrahedral Mesh Generator", ACM Trans, on Mathematical Software, 41 (2), article 11 (February 2015). In certain configuration, the watertight framework is generated as a mesh of three-dimensional cells and block 104 may be omitted.

Then, at block 106, the 3D mesh element volumes, 2D mesh element areas and/or edge lengths may optionally be computed. By way of example, the edge lengths may be used to prioritize a list of source-target node pairs, while areas and/or volumes may be used to validate the edge collapse. In a preferred embodiment, the lengths, areas, and/or volumes may be pre-computed for the three-dimensional mesh elements. In other configurations, it may be advantageous to compute only the measures utilized to rank the source-target node pairs. Then, the additional validation measures may be computed only for elements that are directly connected to one node of a specified source-target node pair. The computation of the 3D mesh element volumes, 2D mesh element areas and/or edge lengths may involve enumerating nodes, edges, faces and/or cells. Face areas, for example, may be computed from node coordinates or from a combination of edge lengths and angles. The computation of the 3D mesh element volumes, 2D mesh element areas and/or edge lengths may also involve the computation of tables and/or graphs that link nodes to edges or edges to nodes, nodes to faces or faces to nodes, and/or nodes to cells or cells to nodes. It may be advantageous to compute some of the tables and/or graphs that link edges to faces or faces to edges, edges to cells or cells to edges, and/or faces to cells or cells to faces. Also, the computation of the 3D mesh element volumes, 2D mesh element areas and/or edge lengths may involve assigning at least one of nodes, edges, faces, or cells to surfaces and/or mesh patches. It may be advantageous to also assign surfaces and/or patches to a plurality of nodes, edges, faces, or cells. Moreover, the computation of the 3D mesh element volumes, 2D mesh element areas and/or edge lengths may involve the classification of nodes as interior node, contact node and/or invariant node. The classification may further be augmented by the designation of protected nodes that may only serve as collapse targets, but not as source.

At block 108, an edge collapse order is identified. The identification of the edge collapse order may include a selection of an ordering rule. A preferred ordering rule may involve be an edge collapse in the order of increasing edge length. Two other ordering rules may include edge collapse in the order of increasing face area and/or in the order of increasing cells volume. When face areas or cell volumes are used to order the collapses, then an auxiliary rule may be specified to select the one edge of the face or cell edges that is to be collapsed. Other ordering rules may be based on size of the angles (e.g., increasing angles). In one configuration, the angles may be ordered based on the increasing magnitudes or may be ordered by decreasing magnitudes. In a preferred configuration, the angles may be ordered by their decreasing absolute difference from 60°. For example, the angles having a larger absolute difference from 60° in the edge collapse order may be assigned a higher priority, or angles having a larger absolute difference from 90° in the edge collapse order may be assigned a higher priority. For ordering rules involving angles, the edge opposed the specified angle is selected for collapse. Edge collapse involves designation of edge nodes as source and target. The lower classified node is the source, the higher classified one the target. In a preferred configuration, the classification is interior less than contact, contact less than invariant and invariant less than protected. A tie-breaker rule specified for orderings where both edge nodes are classified likewise. For example, if edge nodes are classified as interior, then either node may be a source or a target and a tie-breaker rule may be invoked. The tie-breaker rule may designate the first node to be the target, may assign a source and a target randomly, and/or may select the collapse that distorts volumes and areas the least.

Once the edge collapse order is determined, the edge collapse operations are performed, as shown in blocks 110 to 120. In block 110, an edge is selected based on the edge collapse order. The edge may be selected based on the initial ranking within the edge collapse order. In one configuration, the selection may involve skipping over or bypassing edges that were already collapsed or that were considered for collapse, but failed the acceptance threshold, which is described in block 116. In another configuration, a list of the remaining edges may be sorted using the specified edge-collapse criterion or may be updated with every iteration by removing the selected edge from the list. Then, in block 112, the selected edge is collapsed. The collapsing of the edge may involve creating backups for element tables, properties or assignments. For efficiency, it may be advantageous to create tables and data structures to describe nodes, edges, faces, and cells. It may be advantages to have tables that relate nodes, edges, faces, and cells. For example, it may be advantages to have tables relating edges to cells and cells to edges. For example, it may be advantageous to precompute lengths, areas, or volumes and store the results in tables. To undo or disregard a collapse, the initial tables may be recomputed, or preferably, restored from backups. In addition, for elements that connect to source or target nodes, the assignments and the properties for these elements may be stored in memory to facilitate undoing of a collapse. Collapsing an edge may involve identifying the elements that connect to the source or target node and identifying elements that are degenerate when source and target node are one and the same. A degenerate edge has zero length because its two nodes are identical or collocated. A degenerate face has zero area because two nodes are identical or collocated. A degenerate cell has zero volume because two nodes are identical or collocated.

Once the edge is collapsed, the 3D mesh element volumes, 2D mesh element areas and/or edge lengths may be updated, as shown in block 114. The updating of the 3D mesh element volumes, 2D mesh element areas and/or edge lengths may include recomputing the 3D mesh element volumes, 2D mesh element areas and/or edge lengths. The updating of the 3D mesh element volumes, 2D mesh element areas and/or edge lengths may also involve reassigning non-degenerate elements (nodes, edges, faces, and cells) that relate to target or the former source to patches, surfaces, compartments, blocks, or zones.

At block 116, a determination is made whether the collapse is acceptable (e.g., satisfies a threshold). In some configuration, a geometric analysis is performed on the results to determine whether any triangles intersect. Such an analysis may be performed with a tetrahedral mesh generator or a module to perform 3D Delaunay triangulation. Preferably, a heuristics may be invoked in certain configurations to enhance efficiency. In one configuration, this heuristics is based on a threshold. The threshold may include lengths, volumes and/or areas. By way of example, the model volume of all cells should be remain roughly constant under collapse of an edge. Similarly, the surface area for the surface-forming faces should remain roughly constant under collapse of an edge. Further, the length for the mesh-forming edges should remain roughly constant under collapse of an edge. If the model volume or the surface area changes markedly, then the collapse may cause an inconsistency. In a preferred configuration, the model volume or the surface area may be signed, which increases the sensitivity of model volume and surface area to inconsistencies. In one configuration, at least one of volume or area is computed for the entire model or all surfaces. In another configuration, at least one of volume or area is computed for elements that are within a specified distance from either source or target nodes. In a preferred configuration, volume and area may only be computed and compared for elements that formed from at least one of source or target node. If the collapse does not satisfy the threshold, then the collapse is undone, as shown in block 118. The undoing collapse may be performed as an undoing collapse operation that is configured to modify the mesh to the state prior to the selected edge collapse being performed for this specific selected edge. Undoing collapse operation may involve overwriting or replacing the tables with the stored backups or reinserting the removed elements into the tables, recomputing one or more of the edge length, face area, or cell volume, and reassigning properties. If the collapse satisfies the threshold, then a determination is made whether the convergence criterion is satisfied, as shown in block 120. The determination whether the convergence criterion is satisfied may include removing a certain number of nodes, edges, faces, or cells, removing mesh elements below a specific length, removing mesh elements below a specific area, removing mesh elements below a specific volume, or mesh elements with small angles, big angles, or angles with large deviations from a specified angle such as 60° or 90°. If the convergence criterion is not satisfied, then the process performs another iteration and returns to block 110 to select another edge based on the edge collapse order.

If the convergence criterion is satisfied, then the subsurface model may be created and used to perform simulations and for hydrocarbon operations, as shown in blocks 122 to 126. In block 122, a typically geocellular subsurface model is created from the updated watertight model. In some configurations, the tetrahedral cell model enhanced by edge collapses may serve as the cellular model. In another configuration, the triangular mesh model may enhance by edge collapses forms the scaffold for the creation of a geocellular model, such as a pillar grid, a truncated grid, or an unstructured grid. The creation of the subsurface model may include assigning properties to the mesh elements in the updated watertight framework. The assignment of properties may include assigning properties to mesh elements (e.g., cells) associated with one or more objects or other individual sub-volumes. The properties may include transmissibility, rock type, porosity, permeability, rock compressibility, oil saturation, clay content and/or cementation factors, for example. The assignment of properties may include geostatistical techniques to populate the cells with property values that are appropriate for the cells. The properties assigned to the cells of the subsurface model may depend on the type of subsurface model, such as a reservoir model and/or a geologic model.

Once properties are assigned, the subsurface model may be utilized to perform simulations and the model and associated results may be used for hydrocarbon operations, as shown in blocks 124 and 126. At block 124, a simulation is performed with the subsurface model. The subsurface model may be a reservoir model or a geologic model and may be utilized to provide simulation results. The performing the simulation may include modeling fluid flow based on the reservoir model and the associated properties stored within the cells of the reservoir model. The simulation results may include the computation of time-varying fluid pressure and fluid compositions (e.g., oil, water, and gas saturation) and the prediction of fluid volumes produced or injected at wells. The performing the simulation may include modeling structural changes based on the geologic model and the associated properties stored within the cells of the geologic model. For example, reducing reservoir pressure may reduce porosity which may lead to a sagging overburden. The simulation results and/or the reservoir model may be outputted. The outputting of the simulation results and/or the subsurface model may include displaying the simulation results, the geologic model and/or the reservoir model on a monitor and/or storing the simulation results, the geologic model and/or the reservoir model in memory of a computer system. At block 126, the simulation results may be utilized to perform hydrocarbon operations. The hydrocarbon operations may include hydrocarbon exploration operations, hydrocarbon development operations and/or hydrocarbon production operations. For example, the simulation results, the geologic model and/or the reservoir model may be used to estimate or adjust reserves forecasts, reserves estimations and/or well performance prediction. As another example, the simulation results, the geologic model and/or the reservoir model may be used to adjust hydrocarbon production operations, such as installing or modifying a well or completion, modifying or adjusting drilling operations, decreasing fracture penetration, and/or to installing or modifying a production facility. The production facility may include one or more units to process and manage the flow of production fluids, such as hydrocarbons and/or water, from the formation.

Beneficially, this method provides an enhancement in the production, development and/or exploration of hydrocarbons. In particular, the method may be utilized to enhance development and usage of a watertight model by providing an enhanced model with less computational effort, less interactive intervention, and/or in a computationally efficient manner. As a result, this may provide enhancements to production at lower costs and lower risk.

For example, the generation of a geocellular subsurface model from the framework mesh may be performed in block 122. In certain configurations, the geocellular subsurface model may be directly generated from the mesh using a tetrahedral mesh generator. In another configuration, a grid is generated based on the mesh. In the former example, the quality of the grid depends directly on the mesh quality. In the latter case, the computational cost of grid generation depends on various factors, such as the mesh size and the number of mesh elements (e.g., the higher the computational costs of grid generation). In the latter case, mesh quality may also affect grid quality. Grid size greatly influences the computational cost of initialization and performance of a simulation of the subsurface model. Grid quality greatly influence computational costs and numerical stability of the simulation, and thus, the usefulness of the model to predict hydrocarbon operations.

As may be appreciated, the blocks of FIG. 1 may be omitted, repeated, performed in a different order, or augmented with additional steps not shown. Some blocks may be performed sequentially, while others may be executed simultaneously or concurrently in parallel. It may be advantageous to break the initial model into zones, blocks or compartments and enhance each part independently in parallel. For example, in preferred embodiments, the edge collapse order may be modified after each collapse operation is determined to be satisfactory. In some embodiments, it may be advantageous to group edge collapses and perform an entire group of edge collapses without consideration for the threshold performed in block 116 or the convergence in block 120 and test threshold and convergence for the group. This configuration may accept the entire group or reject the entire group. In one configuration, acceptance or rejection of a group of collapses is based on the detection of intersecting faces in the resulting mesh. Similarly, it may be advantageous to provide update a visual representation following each of the collapse operations and/or after block 116 and prior to block 120. In this manner, a user input or other module may provide input on the convergence. It may be advantageous to run the mesh enhancement method with a coarse convergence criterion or until no more collapses can be performed, but outputting the framework periodically. In this manner, the degree of framework simplification may be adjusted by a user.

Figure 2:
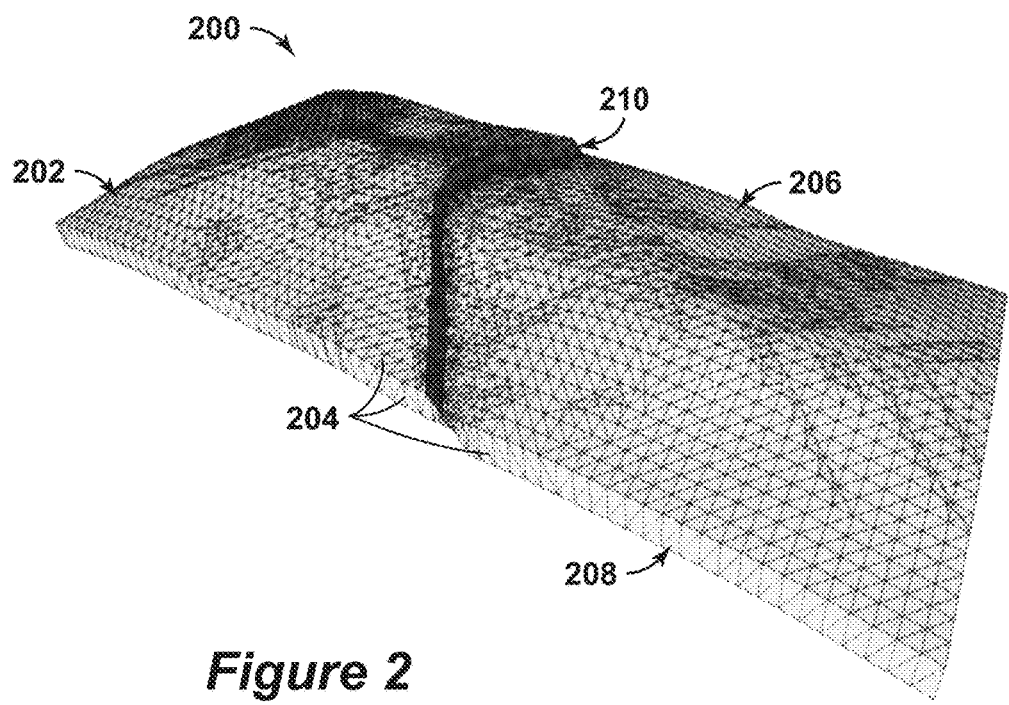
FIG. 2 is an exemplary diagram of a watertight framework formed from triangular meshes.

FIG. 2 is an exemplary diagram 200 of a watertight framework 202 formed from a triangular mesh 204. In this watertight framework 202, a first surface 206 and a second surface 208 are represented by the triangular mesh 204. A fault 210 divides the surfaces 206 and 208.

Figure 3:
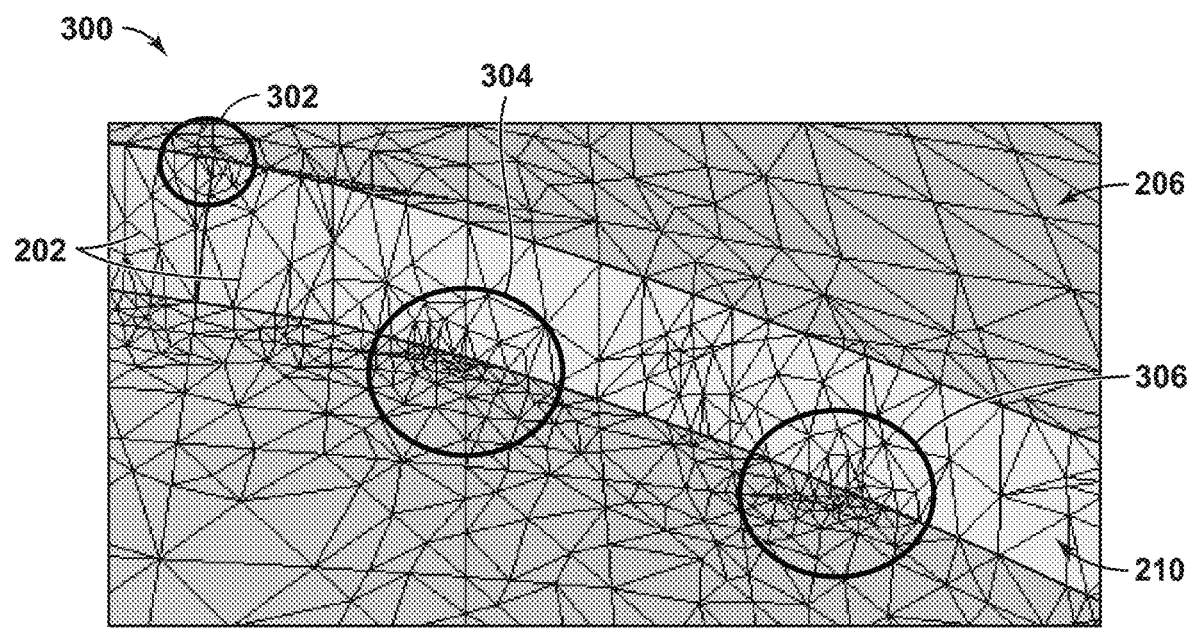
FIG. 3 is an exemplary diagram of a portion of the watertight framework of FIG. 2.

FIG. 3 is an exemplary diagram 300 of a portion of the watertight framework 202 of FIG. 2. This diagram 300 may be a portion of the input into block 102. In this diagram 300, portions of the mesh 204 having ill-shaped triangular meshes, which are indicated by the regions 302, 304 and 306. Within these regions 302, 304 and 306, the triangles formed by the mesh are below a mesh element area threshold. The nests of small ill-shaped may increase the computational costs and complexity of subsequent operations performed on the watertight framework, such as generation of a geocellular grid based on the watertight framework.

Figure 4:
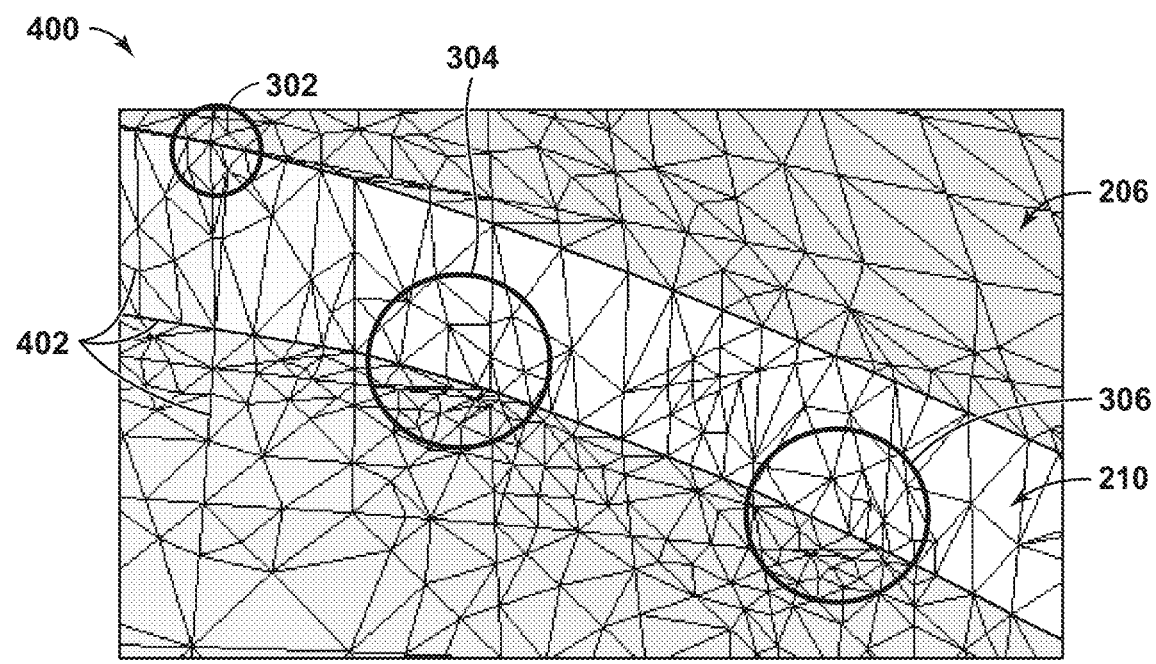
FIG. 4 is an exemplary watertight framework having the ill-shaped triangular meshes removed.

To untangle the nests of small ill-formed triangles while preserving watertightness, the present techniques may be utilized to lessen the computational costs. For example, FIG. 4 is an exemplary diagram 400 of a portion of the watertight framework 202 after the ill-shaped triangular mesh elements are removed from the mesh. In this diagram 400, portions of the mesh 204 in FIG. 3 having ill-shaped triangular meshes, which were indicated by the regions 302, 304 and 306, are modified to form the updated mesh elements in the modified mesh 402. Within these regions 302, 304 and 306, the triangles formed by the mesh are below a mesh element area threshold are collapsed and replaced with other mesh elements that satisfy the mesh element area threshold.

Figure 5:
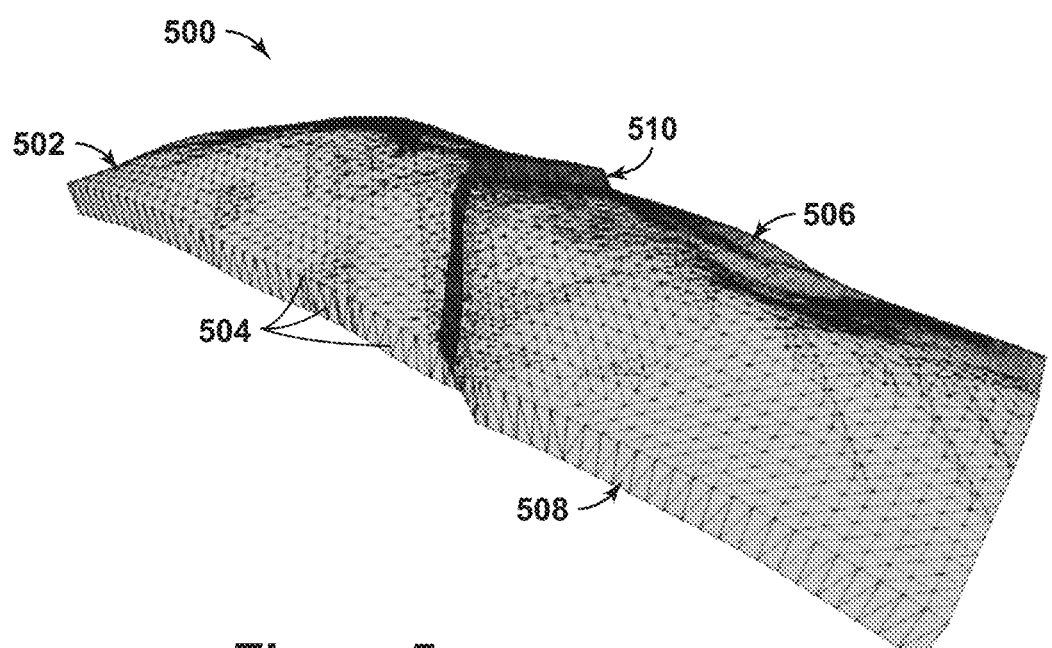
FIG. 5 is an exemplary updated watertight framework having various edges collapsed.

FIG. 5 is an exemplary diagram 500 of an updated watertight framework 502 formed from a triangular mesh 504. In this watertight framework 502, a first surface 506 and a second surface 508 are represented by the triangular mesh 504. A fault 510 divides the surfaces 506 and 508.

As an example, the watertight framework 202 may include 10,400 nodes, 53,500 edges and 76,400 triangles. The method in FIG. 1 may be used to identify an edge collapse order, collapse selected edges based on the edge collapse order, and output an updated watertight model. Accordingly, the watertight framework 502 may include 9,200 nodes; 46,500 edges; and 68,800 triangles. As a result the present techniques may lessen 10,400 nodes to 9,200 nodes; 53,500 edges to 46,500 edges; and 76,400 triangles to 68,800 triangles. The reduced number of triangles and the enhanced shape of the mesh elements may enhance performance of subsequent operations in creating and using the subsurface model.

Persons skilled in the technical field will readily recognize that in practical applications of the disclosed methodology, it is partially performed on a computer, typically a suitably programmed digital computer. Further, some portions of the detailed descriptions which follow are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "processing" or "computing", "calculating", "comparing", "determining", "displaying", "copying," "producing," "storing," "adding," "applying," "executing," "maintaining," "updating," "creating," "constructing" "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present techniques also relate to an apparatus for performing the operations herein. This apparatus may be specially constructed for the required purposes, or it may comprise a general-purpose computer selectively activated or reconfigured by a computer program stored in the computer (e.g., one or more sets of instructions). Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the present techniques can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present techniques are in no way limited to implementation in any specific operating system or environment.

Figure 6:
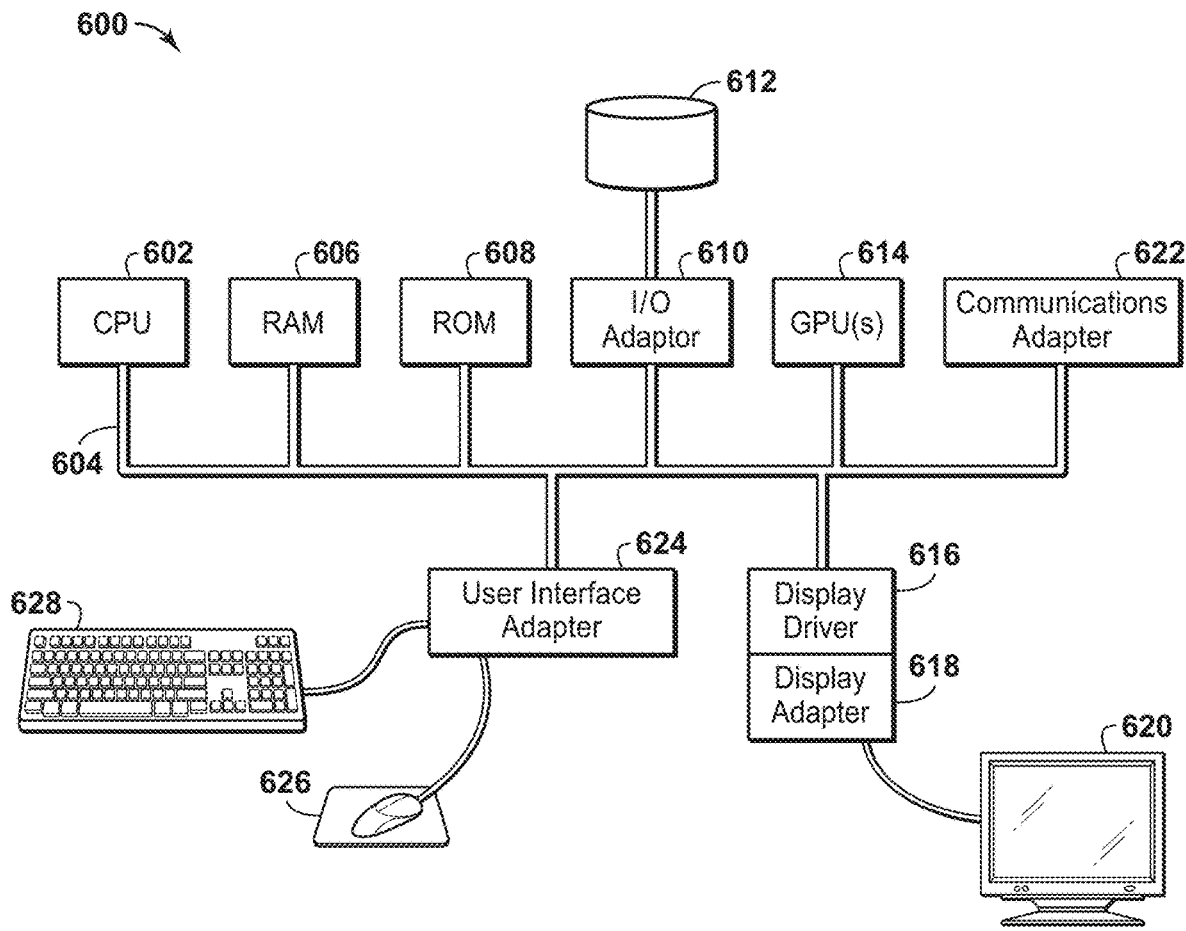
FIG. 6 is a block diagram of a computer system that may be used to perform any of the methods disclosed herein.

As an example, FIG. 6 is a block diagram of a computer system 600 that may be used to perform any of the methods disclosed herein. A central processing unit (CPU) 602 is coupled to system bus 604. The CPU 602 may be any general-purpose CPU, although other types of architectures of CPU 602 (or other components of exemplary system 600) may be used as long as CPU 602 (and other components of system 600) supports the inventive operations as described herein. The CPU 602 may execute the various logical instructions according to disclosed aspects and methodologies. For example, the CPU 602 may execute machine-level instructions for performing processing according to aspects and methodologies disclosed herein.

The computer system 600 may also include computer components such as a random access memory (RAM) 606, which may be SRAM, DRAM, SDRAM, or the like. The computer system 600 may also include read-only memory (ROM) 608, which may be PROM, EPROM, EEPROM, or the like. RAM 606 and ROM 608 hold user and system data and programs, as is known in the art. The computer system 600 may also include an input/output (I/O) adapter 610, a communications adapter 622, a user interface adapter 624, and a display adapter 618. The I/O adapter 610, the user interface adapter 624, and/or communications adapter 622 may, in certain aspects and techniques, enable a user to interact with computer system 600 to input information.

The I/O adapter 610 preferably connects a storage device(s) 612, such as one or more of hard drive, compact disc (CD) drive, floppy disk drive, tape drive, etc. to computer system 600. The storage device(s) may be used when RAM 606 is insufficient for the memory requirements associated with storing data for operations of embodiments of the present techniques. The data storage of the computer system 600 may be used for storing information and/or other data used or generated as disclosed herein. The communications adapter 622 may couple the computer system 600 to a network (not shown), which may enable information to be input to and/or output from system 600 via the network (for example, a wide-area network, a local-area network, a wireless network, any combination of the foregoing). User interface adapter 624 couples user input devices, such as a keyboard 628, a pointing device 626, and the like, to computer system 600. The display adapter 618 is driven by the CPU 602 to control, through a display driver 616, the display on a display device 620.

The architecture of system 600 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

As may be appreciated, the method may be implemented in machine-readable logic, such that a set of instructions or code that, when executed, performs the instructions or operations from memory. By way of example, the computer system includes a processor; an input device and memory. The input device is in communication with the processor and is configured to receive input data associated with a subsurface region. The memory is in communication with the processor and the memory has a set of instructions, wherein the set of instructions, when executed, are configured to perform the method, as described above.

By way of example, a system for generating a subsurface model associated with a subsurface region is described. The system may comprise a processor; an input device in communication with the processor and configured to receive input data associated with a subsurface region; and memory in communication with the processor. The memory having a set of instructions, wherein the set of instructions, when executed, are configured to: obtain a watertight framework associated with a subsurface region, wherein the framework comprises a mesh that includes a plurality of mesh elements and is formed from a plurality of nodes and a plurality of edges; convert two-dimensional mesh elements into three-dimensional mesh elements; compute three-dimensional mesh element volumes, two-dimensional mesh element areas and edge lengths; identify an edge collapse order based on the computed the mesh element volumes, two-dimensional mesh element areas and edge lengths; perform collapse operations on one or more edges based on the edge collapse order until a convergence criterion has been satisfied; and output an updated watertight framework.

In addition, other configurations may include various enhancements. By way of example, the set of instructions, when executed, may be configured to: select an edge based on the edge collapse order; perform a collapse operation on the selected edge; update three-dimensional mesh element volumes, two-dimensional mesh element areas and edge lengths based on the collapse operation; determine whether the collapse operation satisfies a threshold; and undo the collapse operation if the collapse operation does not satisfy the threshold; and store the updated mesh in the watertight framework if the collapse operation satisfies the threshold. The edge collapse order may be based on edge length and wherein the set of instructions, when executed, may be configured to assign a higher priority to larger edge lengths in the edge collapse order; may be based on face area of one of the plurality of mesh elements and wherein the set of instructions, when executed, are configured to assign a higher priority to larger face areas in the edge collapse order; may be based on mesh element volume of one of the plurality of mesh elements and wherein the set of instructions, when executed, are configured to assign a higher priority to larger mesh element volumes in the edge collapse order; and/or may be based on an angle formed by the plurality of mesh elements and wherein the set of instructions, when executed, are configured to assign a higher priority to edges opposite angles having larger absolute difference from 60° in the edge collapse order. In addition, the set of instructions, when executed, may be configured to: determine whether the convergence criterion is satisfied; select another edge based on the edge collapse order, if the convergence criterion is not satisfied; and output the updated watertight framework, if the convergence criterion is satisfied; bypass an edge that has the collapse operation undone in the edge collapse order; wherein the convergence criterion comprises a number of iterations; wherein the convergence criterion comprises one of a number of edges to be removed, a number of nodes to be removed, a number of mesh elements to be removed or any combination thereof; assign properties to one or more of the plurality of mesh element in the watertight model to form a subsurface model; wherein the subsurface model may be a geologic model and the properties comprise one or more of facies, lithology, porosity, permeability, or the proportion of sand and shale, and any combination thereof; wherein the subsurface model may be a reservoir model and the properties comprise one or more of porosity, permeability and any combination thereof; simulate fluid flow within the reservoir model to create simulation results; and/or provide notifications associated with hydrocarbon operations based on the simulation results.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. As such, it will be apparent, however, to one skilled in the art, that many modifications and variations to the embodiments described herein are possible. All such modifications and variations are intended to be within the scope of the present invention, as defined by the appended claims.

The invention claimed is:

1. A method for generating a subsurface model for a subsurface region comprising:
   obtaining a watertight framework associated with a subsurface region, wherein the watertight framework comprises a mesh that includes a plurality of mesh elements and is formed from a plurality of nodes and a plurality of edges;
   determining three-dimensional mesh element volumes, two-dimensional mesh element areas, and edge lengths based on the plurality of mesh elements, the plurality of nodes, and the plurality of edges in the watertight framework;
   identifying an edge collapse order based on the computed the mesh element volumes, two-dimensional mesh element areas, and edge lengths, wherein the edge collapse order is based on an angle formed by the plurality of mesh elements and wherein a higher priority is assigned to edges opposite angles having larger absolute difference from 60° in the edge collapse order;
   performing collapse operations on one or more edges based on the edge collapse order until a convergence criterion has been satisfied, wherein performing collapse operations comprises:
      selecting an edge based on the edge collapse order;
      performing a collapse operation on the selected edge;
      updating three-dimensional mesh element volumes, two-dimensional mesh element areas, and edge lengths based on the collapse operation;
      determining whether the collapse operation satisfies a threshold; and
      undoing the collapse operation if the collapse operation does not satisfy the threshold; and
      storing the updated mesh in the watertight framework if the collapse operation satisfies the threshold; and
   outputting an updated watertight framework.

2. The method of claim 1, wherein the determining three-dimensional mesh element volumes, two-dimensional mesh element areas and edge lengths further comprises:
   converting two-dimensional mesh elements into three-dimensional mesh elements based on the plurality of mesh elements, the plurality of nodes and the plurality of edges in the watertight framework; and computing the three-dimensional mesh element volumes, the two-dimensional mesh element areas and edge lengths.

3. The method of claim 1, wherein the edge collapse order is based on edge length, wherein larger edge lengths have a higher priority in the edge collapse order.

4. The method of claim 1, wherein the edge collapse order is based on face area of one of the plurality of mesh elements, wherein a higher priority is assigned to edges associated with larger face areas in the edge collapse order.

5. The method of claim 1, wherein the edge collapse order is based on mesh element volume of one of the plurality of mesh elements, wherein a higher priority is assigned to edges associated with larger mesh element volumes in the edge collapse order.

6. The method of claim 1, further comprising bypassing an edge in the edge collapse order that has the collapse operation undone.

7. The method of claim 1, wherein performing collapse operations on one or more edges based on the edge collapse order until a convergence criterion has been satisfied further comprises:
   determining whether the convergence criterion is satisfied;
   if the convergence criterion is not satisfied, selecting another edge based on the edge collapse order; and
   if the convergence criterion is satisfied, outputting the updated watertight framework.

8. The method of claim 7, wherein the convergence criterion comprises a number of iterations.

9. The method of claim 7, wherein the convergence criterion comprises one of a number of edges to be removed, a number of nodes to be removed, a number of mesh elements to be removed or any combination thereof.

10. The method of claim 1, further comprising assigning properties to one or more of the plurality of mesh element in the watertight model to form a subsurface model.

11. The method of claim 10, wherein the subsurface model is a geologic model and the properties comprise one or more of facies, lithology, porosity, permeability, or the proportion of sand and shale, and any combination thereof.

12. The method of claim 10, wherein the subsurface model is a reservoir model and the properties comprise one or more of porosity, permeability and any combination thereof.

13. The method of claim 12, further comprising simulating fluid flow within the reservoir model to create simulation results.

14. The method of claim 13, further comprising performing hydrocarbon operations based on the simulation results.

15. A system for generating a subsurface model having one or more objects associated with a subsurface region, comprising:
   a processor;
   an input device in communication with the processor and configured to receive input data associated with a subsurface region;
   memory in communication with the processor, the memory having a set of instructions, wherein the set of instructions, when executed, are configured to:
      obtain a watertight framework associated with a subsurface region, wherein the framework comprises a mesh that includes a plurality of mesh elements and is formed from a plurality of nodes and a plurality of edges;
      determine three-dimensional mesh element volumes, two-dimensional mesh element areas and edge lengths based on the plurality of mesh elements, the plurality of nodes and the plurality of edges in the watertight framework;
      identify an edge collapse order based on the computed the mesh element volumes, two-dimensional mesh element areas and edge lengths, wherein the edge collapse order is based on an angle formed by the plurality of mesh elements and wherein a higher priority is assigned to edges opposite angles having larger absolute difference from 60° in the edge collapse order;
      perform collapse operations on one or more edges based on the edge collapse order until a convergence criterion has been satisfied, wherein performing collapse operations comprises:
         selecting an edge based on the edge collapse order;
         performing a collapse operation on the selected edge;
         updating three-dimensional mesh element volumes, two-dimensional mesh element areas, and edge lengths based on the collapse operation;
         determining whether the collapse operation satisfies a threshold; and
         undoing the collapse operation if the collapse operation does not satisfy the threshold; and
         storing the updated mesh in the watertight framework if the collapse operation satisfies the threshold; and
      output an updated watertight framework.

16. The system of claim 15, wherein the set of instructions, when executed, are configured to:
   convert two-dimensional mesh elements into three-dimensional mesh elements based on the plurality of mesh elements, the plurality of nodes and the plurality of edges in the watertight framework; and
   compute the three-dimensional mesh element volumes, the two-dimensional mesh element areas and edge lengths.

17. The system of claim 15, wherein the edge collapse order is based on edge length and wherein the set of instructions, when executed, are configured to assign a higher priority to larger edge lengths in the edge collapse order.

18. The system of claim 15, wherein the edge collapse order is based on face area of one of the plurality of mesh elements and wherein the set of instructions, when executed, are configured to assign a higher priority to larger face areas in the edge collapse order.

19. The system of claim 15, wherein the edge collapse order is based on mesh element volume of one of the plurality of mesh elements and wherein the set of instructions, when executed, are configured to assign a higher priority to larger mesh element volumes in the edge collapse order.

20. The system of claim 15, wherein the set of instructions, when executed, are configured to bypass an edge that has the collapse operation undone in the edge collapse order.

21. The system of claim 15, wherein the set of instructions, when executed, are configured to:
   determine whether the convergence criterion is satisfied;
   select another edge based on the edge collapse order, if the convergence criterion is not satisfied; and
   output the updated watertight framework, if the convergence criterion is satisfied.

22. The system of claim 21, wherein the convergence criterion comprises a number of iterations.

23. The system of claim 21, wherein the convergence criterion comprises one of a number of edges to be removed, a number of nodes to be removed, a number of mesh elements to be removed or any combination thereof.

24. The system of claim 15, wherein the set of instructions, when executed, are configured to: assign properties to one or more of the plurality of mesh element in the watertight model to form a subsurface model.

25. The method of claim 24, wherein the subsurface model is a geologic model and the properties comprise one or more of facies, lithology, porosity, permeability, or the proportion of sand and shale, and any combination thereof.

26. The system of claim 24, wherein the subsurface model is a reservoir model and the properties comprise one or more of porosity, permeability and any combination thereof.

27. The system of claim 26, wherein the set of instructions, when executed, are configured to: simulate fluid flow within the reservoir model to create simulation results.

28. The system of claim 27, wherein the set of instructions, when executed, are configured to: provide notifications associated with hydrocarbon operations based on the simulation results.

\* \* \* \* \*